Patented Feb. 19, 1935

1,991,448

UNITED STATES PATENT OFFICE 1,991,448

CATALYTIC MASSES AND PROCESS OF PREPARING THE SAME

Gerald C. Connolly and Jeremiah A. Pierce, Baltimore, Md., assignors, by mesne assignments, to Chester F. Hockley, receiver for The Silica Gel Corporation, Baltimore, Md., a corporation of Maryland No Drawing. Application December 4, 1930, Serial No. 500,135

6 Claims. (Cl. 23—233)

This invention relates to catalytic masses, and processes of preparing the same.

The principal object of the present invention is to produce a product adapted for catalytic purposes which is sufficiently resistant to withstand the roughest usage, which gives highly efficient results in use, which minimizes back pressure, and which is economical to prepare as compared with agents as heretofore proposed.

The process according to the present invention comprises treating a carrier material to impregnate the same with a catalytically active substance, incorporating a reinforcing substance with the carrier material at any stage of said treatment, and converting the mass into a hard, solid, rigid product.

The treating of the carrier material to impregnate the same with a catalytically active substance may be carried out in a number of ways, and the active substance may consist of a single or a plurality of compounds. For example, the carrier material may be impregnated with a metal salt capable of being converted into an active substance as by immersing same in a solution of said salt, and then converting the metal salt to an active substance as by heating or by oxidation or reduction. Also, the carrier material may be caused to adsorb a reacting gas, and then subsequently contacted with a compound adapted to form upon reaction with the adsorbed gas an active substance. If desired, the carrier material may be treated with a reactant substance, so as to charge same partially or completely, and then with a solution of a compound of a metal capable of reacting with said reactant substance in an amount less than or substantially equal to that required to react with all of the reactant substance to form an active compound of said metal. The thus described methods yield products having the active substance present in only one form.

The carrier material may also be treated in such manner that the active substance associated therewith is present in more than one form, for example, as two different compounds of the same metal but of different valences. The process for effecting this treatment comprises treating a carrier material with a solution of a reactant substance of such concentration so as to fully charge the material, the concentration being preferably greater than 0.25% by weight, then treating it with a solution of a compound of a metal capable of being converted by said reactant substance into an active compound of said metal, which may or may not contain an activator or stimulator substance, in an amount in excess of that required to chemically combine with said reactant substance, and finally drying without washing. If desired, the carrier material may be treated with a solution of a compound of a metal capable of being converted by a reactant substance into an active compound of said metal and then with a solution of a reactant substance in an amount less than that required to chemically combine with said metal compound, followed by drying without washing. Although both processes produce satisfactory products, the former process is the preferred one.

The invention comprehends the employment of any carrier material which includes a hydrous oxide, dehydrated or not, alone or in admixture with other substances. The term "hydrous oxide" is intended to include any hydrogel and/or jelly, and/or precipitate whether gelatinous or not, or mixtures of the two, of any oxide as for example, silica, germania, chromia, tungstia, titania, alumina, stannia, and the like, or mixtures of said oxides. Then again, the carrier material may consist of a zeolite compound or powdered solid material of any nature which is unaffected by heat or chemical reaction to such degree as to destroy its value as a carrier, for example, fuller's earth, kieselguhr, gel fines of any kind, and the like, either alone or in admixture, with or without other substances.

The reactant substance with which the carrier material is treated may be either a compound capable of being selectively adsorbed by the carrier material, as for example, a hydroxyl bearing compound or one which diffuses into the carrier material without being selectively adsorbed thereby, as for instance, a non-hydroxyl bearing compound. The hydroxyl bearing compound may consist of an aqueous solution of either the hydroxides of the alkali metals, as sodium, potassium, lithium, caesium, rubidium; the hydroxides of the alkaline earth metals, as calcium, strontium, and barium; the hydroxides of the non-metals such as ammonium hydroxide; hydroxyl containing amines such as the ethanolamines, mono-, di-, and tri-ethanolamines, hydroxylamine; or compounds which hydrolyze readily and yield upon hydrolysis compounds exhibiting the properties of the hydroxides of the alkali bearing metals such as the carbonates of the alkali forming metals, and carbamates.

The non-hydroxyl bearing compound may consist of an aqueous solution of either a salt of a metal which, when the carrier material impregnated therewith is treated with a solution of a salt of another metal, reacts therewith to form an active compound of said other metal, as for example, salts of the alkali metals, potassium vanadite, soluble salts of silver, chromium, zinc, palladium, platinum, tin, iron, calcium, copper, nickel, etc.; or non-hydroxyl containing amines such as aniline and the like.

The metal compound capable of being converted by a reactant substance into an active compound of said metal, may be a salt of a metal capable of forming either hydrous oxides or insoluble basic salts upon reaction with said reactant substance. The metallic salts which may be used for this purpose are those of the metals such as iron, chromium, aluminum, gallium indium, thorium, copper, cobalt, nickel, silver, gold, beryllium, magnesium, zinc, cadmium, mercury, lead, germanium, tin, titanium, zirconium, cerium, terbium, yttrium, bismuth, molybdenum, tungsten, uranium, manganese, ruthenium, rhodium, palladium, caesium, iridium, vanadium, and platinum. Of the salts of the metals mentioned, it is preferred to use those of vanadium.

The concentration of the solution of the reactant substance with which the carrier material is treated is dependent upon the nature of the carrier material and the amount of active metal compound required in the final product. In the case where the carrier is a hydrogel, and the reactant substance is a hydroxyl bearing compound, the strength of the hydroxyl bearing compound solution may be such as to charge the hydrogel partially or completely without attacking the structure thereof, as for example, 0.02 to 0.2% by weight. Also, it may be of such strength as to completely charge the hydrogel and also react therewith to a limited extent or to such degree as to modify its character without destroying the structure thereof, as for instance, 0.25 to 1%, and even as high as 5% by weight.

Where the reactant substance employed is a non-hydroxyl bearing compound which is chemically inert with respect to the hydrous gel or carrier materials other than a hydrous gel, the strength of the solution of such compound may range from 0.5% to 10% by weight or even higher.

The strength of the solution of the metal compound capable of being converted by a reactant substance into an active compound of said metal with which the carrier material charged with reactant substance is treated is variable. It may be of a concentration which is less than, equal to, or in excess of the theoretical amount required to chemically combine with all of the reactant substance.

Where it is desired to produce a product having an activator or stimulator substance present therein, the substance is admixed with the solution of the metal compound capable of being converted by a reactant substance into an active compound of said metal. Such substance may be a salt of aluminum as aluminum sulphate; compounds of boron such as sodium tetraborate, boric acid, or potassium tetraborate or mixtures thereof; compounds of calcium such as calcium chloride; or salts of tin, iron, thorium, bismuth, beryllium, titanium, and other metals.

The reinforcing substance employed may be any material which possesses the inherent property of becoming plastic under suitable treatment, and which when subjected to a high degree of heat as baking is changed into a non-plastic, highly porous, hard, rigid, solid. Clays containing a large percentage of aluminum silicate or aluminum and silica, as for example, Japanese clay, ball or fire clays, or any other clay having the inherent property of becoming plastic under suitable treatment have been found especially suitable. The aforementioned clays may be used alone or inadmixture in varying amounts. Of the clays mentioned, Japanese clay is preferred.

The reinforcing substance may be incorporated in the carrier material before, during, or after, the treatment of the carrier material so as to cause an active substance to become associated therewith. Preferably, it is incorporated in the carrier material after it has been impregnated with the active substance.

The quantity of reinforcing substance added may vary within wide limits and may be as low as 6% or less and as high as 14% or higher by weight of the finished product.

To convert the mass of impregnated carrier material having a reinforcing substance disseminated therethrough into a final product which exhibits increased hardness and rigidity, it is necessary that the mass be heated to a temperature sufficient to bake same without fusing any of the constituents thereof. Heating the mass to a temperature of from 800° C. up to and not exceeding 900° C. preferably 850° C. to 875° C., is sufficient to bake it, thereby forming a satisfactory product. Preferably, the mass is first heated to a temperature of, say 120° to 300° C., to nearly dehydrate same, and then to the temperature sufficient to bake same.

The product thus produced is of an exceedingly rigid structure and will withstand considerably more pressure than products made by prior processes.

The present invention is of particular economic value when a hydrogel is utilized as the carrier material, because hydrogel of any size particle may be used. Thus, waste hydrogel not utilizable in other processes may be used to advantage.

The mass of the present invention will be found suitable for many processes in the arts and has been found to be especially suitable as a catalyst for the conversion of sulphur dioxide into sulphur trioxide at an elevated temperature. The agent produced according to the present invention showed conversion in such process of between 99.1 and 99.2%.

The theory thought to underlie the improved conversion results is as follows: High conversion is thought to depend upon surface exposure to a greater extent than it does on actual content of active material. In other words, the active material inside a granule of gel exerts a comparatively small influence on conversion. The mixing and drying of the gel with the clay, according to the present process, distributes the fine particles of the gel through the larger pores or voids of the clay and each individual particle of the gel becomes relatively a great distance from the other particles whereby a greater surface is available to react with gases passing therethrough during the conversion process. The voids of baked clay have been reported to be about 1000 times as large as those of gel.

*Example 1*

In producing a catalytic mass having the active substance present in only one form, a carirer material containing a hydrous oxide such as a hydrogel of silica is treated with a dilute solution of an alakli such as sodium hydroxide for a sufficient length of time to enable more or less of the alkali to be adsorbed in the hydrogel, the concentration of the alkali solution being insufficient to react with the hydrogel (for example, between 0.02 to 0.2% by weight), separating the hydrogel from the solution, and rinsing it.

The carrier containing the hydrogel charged with alkali is then treated with a solution of a salt of a catalytically active metal, as for example, ferric nitrate, of such concentration and in such amount as to react with all of the adsorbed alkali and form a compound such as hydrated ferric oxide, capable of being converted into a catalytically active form. This is done by soaking the hydrogel in the ferric nitrate solution for several hours, say about 5 hours. The hydrogel is removed from the spent solution, and washed so as to remove the excess metal salt.

A reinforcing agent such as ball clay is next incorporated in the treated hydrogel as by grinding, kneading, and the like. The quantity of clay used may be that amount which will give a product containing 10% clay or less. The mass is then dried or extruded and then dried. The drying may be effected by heating the mass to a temperature of 150° to 200° C. The dried mass is then heated to a temperature of about 850° C. for about 30 minutes or longer to bake same.

The product thus obtained comprises granules containing silica gel and clay integrally bound together and having iron in an active form disseminated throughout the granules.

Example 2

In producing a catalytic mass having the active substance present in two different forms or valences, a carrier containing a hydrous oxide such as a hydrogel of silica, preferably with a dry surface, is immersed in a solution of a hydroxyl bearing compound, as for example, sodium hydroxide of about 1% strength by weight, and is allowed to remain therein for a sufficient time to enable the alkali to be adsorbed and react with the hydrogel to a limited extent, but not to such a degree that the structure of the hydrogel is destroyed. Soaking the hydrogel in the sodium hydroxide solution for a number of hours, say 18 hours, is sufficient.

The hydrogel is separated from the sodium hydroxide solution in any well known manner as by draining, rinsed once in water and then placed upon a sieve and allowed to remain there until the water drains from its exterior surface.

The carrier containing the hydrogel charged with the sodium hydroxide is next immersed in a solution of vanadyl sulphate produced in any well known manner. It is allowed to remain therein until the reaction between the vanadyl sulphate and sodium hydroxide is complete. Usually immersion for 24 hours is sufficient. The strength of the vanadyl sulphate solution is such that there is a slight excess after the soaking has been completed. A vanadyl sulphate solution containing 0.0327 grams per cubic centimeter of water expressed as $V_2O_5$ gives satisfactory results. Although a vanadyl sulphate solution of the aforesaid strength is used, it is to be understood that solutions of a greater or lesser strength may be employed.

The carrier containing the hydrogel is then drained, rinsed once with water and mixed with a quantity of clay such as Japanese clay which will give a product when dried containing about 8% clay or less. The mixture is ground together in any suitable manner producing a pasty mass of a homogeneous consistency. The mass is then extruded through a coarse sieve or perforated plate and dried in any suitable manner. The dried product may be broken into pieces of any desired length or size. The drying may be effected by passing air at a temperature of 75° to 120° C. over the material and later at a higher temperature as 300°. The dried product is then heated to a temperature of 875° C. for about 30 minutes or longer to bake same.

The product thus obtained comprises granules containing silica gel and clay integrally bound together, and having vanadium present in two different forms intimately disseminated throughout the granules.

Example 3

A carrier containing a hydrogel of silica of any particle size, preferably fairly dry on the surface, is soaked in a water solution of potassium carbonate of 1 to 10%, preferably 5% strength by weight. The solution should completely cover the gel and preferably should cover it by several inches. A period of soaking of about 18 hours has been found satisfactory.

After the soaking period is ended, the liquid is thoroughly drained from the hydrogel. If the used carbonate solution is still strongly alkaline, a very rapid rinse with water is desirable at this time. If this step is employed, the rinse water should be allowed to drain from the hydrogel.

The carrier containing the hydrogel charged with potassium carbonate is next treated with a vanadyl sulphate solution containing an activator or stimulator substance of a strength slightly in excess of that required to react with all of the potassium carbonate. The vanadyl solution employed may be prepared by dissolving aluminum sulphate in a solution of vanadyl sulphate containing 0.0327 grams per cubic centimeter of water expressed as $V_2O_5$, and then adding an aqueous solution of potassium tetraborate thereto. If a precipitate forms sufficient water is added to dissolve it. Both the aluminum sulphate and potassium tetraborate are preferably added to the vanadyl sulphate solution in an amount of about 8 to 12 grams to each 300 cc. of the vanadyl sulphate solution. The hydrogel is treated with such vanadyl sulphate solution as by immersing same in said solution, and allowing same to remain therein until the reaction between the potassium carbonate and vanadyl sulphate is complete. Soaking for about 24 hours or less is sufficient. During the soaking it is desirable to occasionally agitate the mass. The spent solution is then separated from the hydrogel by draining. If desired, the hydrogel may be rapidly rinsed with water.

A quantity of clay is then incorporated in the treated carrier containing the hydrogel, dried, and baked, or extruded, dried, and baked in the manner described in Example 2.

The product thus formed comprises granules containing silica gel and clay integrally bound together and having the vanadium in two different forms together with compounds of aluminum and boron intimately distributed throughout the granules.

The above product may be heated for an hour or two in a stream of sulphur dioxide at 550° to 650° C. or it may be activated with air instead. The activation step is not necessary but is desirable in some cases, depending upon the particular use of the agent.

Example 4

A silica hydrogel is mixed with about 14% by weight of fire clay and is soaked in a solution of ammonium vanadite for about 24 hours or less. The ammonium vanadite solution may be of a concentration of 0.1 to 2 normal, but preferably is of 0.3 normal.

The hydrogel and clay mixture is separated, as by draining, from the excess solution.

The charged material is then immersed in a solution of chromium chloride of a concentration of 0.1 to 1 normal, preferably 0.1 normal. The chromium chloride solution is used in such quantity as to be slightly less than that required to chemically combine with all of the ammonium vanadite. It is allowed to remain therein long enough for the chloride and vanadite solutions to react, say 24 hours or less. The excess solution is removed by draining whereupon the treated hydrogel is dried and baked or extruded, dried, and baked in the manner described in Example 2.

The product thus formed comprises granules composed of silica gel and clay integrally bound together having vanadium present in two different forms intimately distributed in and on the granules.

Example 5

A carrier material consisting of a tightly packed mass of finely divided kieselguhr is placed in a receptacle. An ammonium hydroxide solution is then introduced into said receptacle in an amount sufficient to submerge the kieselguhr. The concentration of the ammonium hydroxide solution employed is of about 2% strength by weight. Soaking for a number of hours, for instance 20 hours, is sufficient to fully charge the mass of carrier material. The ammonium hydroxide solution is then separated from the mass of carrier material as by draining.

A solution of vanadium acetate is then introduced into the receptacle in an amount sufficient to completely submerge the mass of kieselguhr charged with ammonium hydroxide. The vanadium salt solution should be of a concentration such as to be slightly more than that required to chemically combine with all of the alkali. A vanadium acetate solution of about 0.5 N. gives good results.

Fire clay in an amount such as to give a product when dried containing about 8% of clay or less is incorporated with the impregnated carrier material. It is then dried and baked, or extruded, dried, and baked in the manner described in Example 2.

The product thus obtained comprises granules containing kieselguhr and clay integrally bound together, and having vanadium in two different forms distributed in and on the granules.

Example 6

A mass of gel fines of silica is placed in a receptacle in such manner as to form a tightly packed mass. A calcium chloride solution is then introduced into the receptacle in an amount sufficient to cover the mass of gel fines. The concentration of calcium chloride solution may vary from 0.1 to 1.0 normal. The mass of gel fines is allowed to soak in the calcium chloride solution for a number of hours, say 24 hours, whereupon it is separated therefrom as by draining.

A sodium-ortho-vanadate solution is next introduced into the receptacle in an amount sufficient to completely submerge the gel fines. The concentration of the sodium vanadate solution is such as to be slightly in excess of that required to react with the calcium chloride. A sodium vanadate solution of about 1 normal gives satisfactory results. Soaking for a number of hours, say 24 hours, is sufficient to complete the reaction.

Japanese clay in an amount such as to give the product containing about 10% of clay or less, is mixed with the impregnated carrier material, and the mixture thoroughly kneaded so as to incorporate the clay therein. The mass is then dried, and baked, or extruded, dried, and baked in the manner described in Example 2.

The product thus obtained comprises granules containing silica gel and clay integrally bound together, and having vanadium in two different forms distributed in and on the granules.

Various specified details of procedure and conditions of operation have been set forth above for the purpose of giving a clear understanding of the process, but the invention is not limited to the exact details given, as it includes modifications and changes coming within the scope of the appended claims.

The adjective "active" as employed in the specification and claims is intended to refer to catalytically active compounds or substances. The term "impregnated" as employed in the specification and claims is intended to cover depositing the active substance on the surface of or in the pores of the carrier.

Having thus described the invention, what is claimed as new and desired to be secured by Letters Patent is:—

1. The process of preparing a catalytic mass containing a catalytically active substance in the form of at least two different compounds, consisting in treating a carrier material including a hydrous oxide with a solution of a salt of chromium, separating the impregnated carrier material from the solution, treating the impregnated carrier material with a solution of a salt of vanadic acid, said vanadic acid solution being taken in an amount in excess of that required to chemically combine with the chromium salt, incorporating a reinforcing substance with said carrier material, and baking the mass.

2. The process of preparing a catalytic mass having an active substance in the form of at least two different compounds, consisting in treating a carrier material with a reactant substance of a concentration greater than 0.25% by weight to charge the carrier material, then treating the carrier material with a solution of a compound of a metal capable of reacting with said reactant substance to form an active compound of said metal, said metal compound solution being taken in an amount in excess of that required to chemically combine with the reactant substance, incorporating clay with said carrier material at any stage of the treatment, and baking the mass.

3. The process of preparing a catalytic mass containing an active substance in the form of at least two different compounds, consisting in treating a carrier material including a hydrous oxide with a solution of a hydroxyl bearing substance of a concentration greater than 0.25% by weight to charge the hydrous oxide by adsorption and react therewith to a limited extent, then treating said carrier material with a solution of a compound of a metal capable of reacting with the hydroxyl bearing substance to form an active compound of said metal, said metal compound solution being taken in an amount in excess of that required to chemically combine with the hydroxyl bearing substance, incorporating clay with said carrier material at any stage in the treatment, and baking the mass.

4. The process according to claim 3 wherein the solution of the metal compound contains an activator substance.

5. The process according to claim 3 wherein the hydroxyl bearing substance is a hydroxide of one of the members of the group consisting of alkali metals, alkaline earth metals, and ammonium.

6. The process according to claim 3 wherein the metal compound is vanadyl sulphate.

GERALD C. CONNOLLY.
JEREMIAH A. PIERCE.